United States Patent
Jansen

(10) Patent No.: US 10,465,819 B2
(45) Date of Patent: Nov. 5, 2019

(54) PIPE BRANCHING MANIFOLD AND METHOD OF OPERATING THE SAME

(71) Applicant: MOKVELD Valves B. V., AJ Gouda (NL)

(72) Inventor: Jelte Adriaan Jansen, Kuala Lumpur (MY)

(73) Assignee: MOKVELD Valves B. V., AJ Gouda (NL)

( * ) Notice: Subject to any disclaimer, the term of this patent is extended or adjusted under 35 U.S.C. 154(b) by 151 days.

(21) Appl. No.: 15/662,146

(22) Filed: Jul. 27, 2017

(65) Prior Publication Data

US 2018/0010711 A1 Jan. 11, 2018

Related U.S. Application Data

(63) Continuation of application No. PCT/EP2016/050074, filed on Jan. 5, 2016.

(30) Foreign Application Priority Data

Feb. 6, 2015 (EP) ..................................... 15154113

(51) Int. Cl.
*F16K 35/14* (2006.01)
*F16K 1/16* (2006.01)

(52) U.S. Cl.
CPC ................ *F16K 35/14* (2013.01); *F16K 1/16* (2013.01)

(58) Field of Classification Search
CPC ................................... F16K 35/14; F16K 1/16
See application file for complete search history.

(56) References Cited

U.S. PATENT DOCUMENTS

| 4,429,711 | A | | 2/1984 | Schomer | |
|---|---|---|---|---|---|
| 4,432,392 | A | * | 2/1984 | Paley | .................. A61M 39/223 |
| | | | | | 137/343 |
| 6,220,290 | B1 | * | 4/2001 | Lomax | .................. F16K 5/0668 |
| | | | | | 137/613 |
| 9,097,622 | B2 | * | 8/2015 | Gotch | .................. F16K 27/065 |

FOREIGN PATENT DOCUMENTS

| FR | 1358575 A | 4/1964 |
|---|---|---|
| GB | 772207 A | 4/1957 |
| GB | 2260387 A | 4/1993 |

* cited by examiner

*Primary Examiner* — Kevin L Lee
(74) *Attorney, Agent, or Firm* — Von Rohrschiedt Patents

(57) ABSTRACT

A pipe branching manifold including a multitude of pipe branches, wherein each pipe branch of the multitude of pipe branches includes an entry block valve, an exit block valve, and a bleed outlet including a bleed valve arranged between the entry block valve and the exit block valve, wherein in a standard operation of each pipe branch a respective entry block valve and a respective exit block valve is open and a respective bleed valve is closed, wherein in a test operation or maintenance operation of each pipe branch the respective entry block valve and the respective exit block valve is closed, and the respective bleed valve is open, wherein the pipe branching manifold includes a selector device for selecting either none or one out of the multitude of pipe branches for switching from the standard operation to the test operation or the maintenance operation.

15 Claims, 13 Drawing Sheets

PIPE BRANCHING MANIFOLD AND METHOD OF OPERATING THE SAME

RELATED APPLICATIONS

This application is a continuation of International Application PCT/EP2016/050074 filed on Jan. 5, 2016 claiming priority from European Patent Application 15154113.3 filed on Feb. 6, 2016, both of which are incorporated by their entirety by this reference.

FIELD OF THE INVENTION

The invention relates to a pipe branching manifold and to a method of operating the same, the pipe branching manifold having a multitude of pipe branches, each of the pipe branches having an entry block valve, an exit block valve, and a bleed outlet with a bleed valve between the entry block valve and the exit block valve, wherein in a standard operation of each pipe branch, the respective entry block valve and exit block valve are open, and the respective bleed valve is closed, and wherein in a test operation or maintenance operation of each pipe branch, the respective entry block valve and exit block valve are closed, and the respective bleed valve is open, and the manifold having a selector device for selecting either none or one out of the pipe branches for switching from standard operation to test operation or maintenance operation, wherein the selector device allows only the one entry block valve of the selected pipe branch to be closed, which subsequently allows the respective bleed valve and exit block valve to be opened and closed to switch to the test operation or to the maintenance operation respectively.

Alternatively wherein in a test operation of each pipe branch the entry block valve is closed and both the bleed valve as well as the exit block valve are open, enabling the bleed valve to be used as entry point for a test fluid at a test pressure and wherein in a maintenance operation of each pipe branch the respective entry block valve and exit block valve are closed and the respective bleed valve is open, where by alternatively a dedicated test connection can be added downstream of the exit block valve.

BACKGROUND OF THE INVENTION

Devices featuring the above are commonly known as "one out of N double block-and-bleed manifold", wherein "N" is a digit above 1, and the phrases "one out of N" and "double block-and-bleed" are often abbreviated as "1ooN" and "dbb". 1oo3 dbb manifolds are in particular used in "High Integrity Pressure Protection Systems" (HIPPS) for a fluid line, in particular in oil or gas piping systems. In such HIPPS, the three lines of the 1oo3 dbb manifold—it can also be two lines of 1oo2, or more (four lines or more)—each contact independent pressure transmitters or switches to the pressure to be monitored downstream of an ON/OFF-Valve. Whenever any of the pressure transmitters signals the pressure to exceed a critical value, the HIPPS closes the one or more valve(s). The pressure is measured by the pressure transmitters, the pressure transmitter signal is voted 2oo3 by the logic solver, when 2 of the 3 transmitters give high signal, the logic solver will close one or more valves to prevent further pressure increase.

Having three independent pressure transmitters ensures redundant measurement, and operation without interruption in particular during periodical inspection, testing, calibration, maintenance, repair or replacement (hereinafter summarized as "test and maintenance") of the pressure transmitters: For inspection of any of the pressure transmitters, the related pipe branch is separated from the fluid pipe by closing its entry block valve, remaining pressure released from the pressure transmitter by opening its bleed valve to the ambience, and the pressure transmitter isolated from the ambience by closing its exit block valve. After inspecting and/or maintaining the pressure transmitter, any remaining pressure is released from the pressure transmitter by opening the exit block valve, then the pressure transmitter closed from the ambience by closing the bleed valve, and last the pressure transmitter re-connected to the fluid line by opening the entry block valve.

ASTAVA B. V., Meppel/NL provides an interlocking system for a 1oo3 and 1oo2 dbb manifold, based on a crank handle that is mechanically caught in a complex track, that only allows, by positioning and turning the handle, first to select a pipe Branch, then to close the entry block valve, then to open the bleed valve, and last to close the exit block valve of the selected branch. Smith Flow Control Ltd., Lynbrook/AU and Netherlocks Safety Systems, Alphen aan den Rijn/NL each provide elaborate loose key systems, wherein any key, if delivered from a control room, and applied to a compatible valve, allows the operator only to open or close this same valve. Both the known track-caught handle, and the known key systems, allow for building pipe branching manifolds according to the above.

In technical background of the invention, U.S. Pat. No. 4,429,711 A discloses a multivalve interlock and control system for connecting a pair of pipelines to a differential pressure measuring instrument. The known system has three valves, each driven by a swiveling handle, each of the handles having a circular control device, that has up to three notches for mechanically interacting with the other control device, so as to allow the valves to be opened or closed in a mechanically defined sequence, only.

Disadvantages of prior art: cumbersome to operate, not easy to adapt for remote operation like subsea operation.

BRIEF SUMMARY OF THE INVENTION

It is an object of the invention to provide a 1ooN dbb pipe branching manifold that is kept both mechanically simple, and easy to operate and can be adapted for remote operation by a so called ROV in a subsea application.

The object is achieved by a pipe branching manifold including a multitude of pipe branches, wherein each pipe branch of the multitude of pipe branches includes an entry block valve, an exit block valve, and a bleed outlet including a bleed valve arranged between the entry block valve and the exit block valve, wherein in a standard operation of each pipe branch a respective entry block valve and a respective exit block valve is open and a respective bleed valve is closed, wherein in a test operation or maintenance operation of each pipe branch the respective entry block valve and the respective exit block valve is closed, and the respective bleed valve is open, wherein the pipe branching manifold includes a selector device for selecting either none or one out of the multitude of pipe branches for switching from the standard operation to the test operation or the maintenance operation, wherein the selector device allows only an entry block valve of a selected pipe branch of the multitude of pipe branches to be closed, which subsequently allows a respective bleed valve and a respective exit block valve of the selected pipe branch to be opened and closed to switch to the test operation or to the maintenance operation respectively, wherein the selector device includes a standard blocking element and a test permitting element, wherein the entry block valve includes an entry control device which includes a standard blocking counter element positively fitting to the standard blocking element, and a test permitting counter element positively fitting to the test permitting element, wherein in the standard operation of the respective pipe branch, mechanical interaction of the standard blocking element and the standard blocking counter element prevents the entry block valve from closing, and wherein after selecting the respective pipe branch for test operation mechanical interaction of the test permitting element and the test permitting counter element allows for closing the entry block valve and subsequent opening and closing of the respective bleed valve and the respective exit valve to enable either the test operation or the maintenance operation.

The invention suggests that the selector device has a standard blocking element, and a test permitting element, and that each of the entry block valves has an entry control device with a standard blocking counter element positively fitting to the standard blocking element, and with a test permitting counter element positively fitting to the test permitting element, wherein in standard operation of the respective pipe branch, mechanical interaction of the standard blocking element and the standard blocking counter element prevents the entry block valve from closing, and wherein after selecting the respective pipe branch for test operation, mechanical interaction of the test permitting element and the test permitting counter element allows for closing the entry block valve and subsequent opening and closing of the respective bleed valve and exit valve, to enable either the test operation or the maintenance operations.

The selector device in the pipe branching manifold according to the invention, in interacting with each of the entry control device has a double function: In standard operation this interaction blocks the respective entry block valve (which necessarily implies the selector device to be an integral part of the pipe branching manifold), and in test operation or maintenance operation releases the selected entry block valve and subsequently the other valves in the branch. Both the double function of the selector device, and its integration as a component into the pipe branching manifold, keeps the same mechanically simple, can be locked, and easy to operate.

Preferably, in a pipe branching manifold according to the invention, the standard blocking counter element and the test permitting element are notches, shaped into the selector device, and into the entry control device, respectively. Notches can easily be shaped into the selector device, and into the entry control device, e.g. by mold forming, or by milling.

Advantageously, in a pipe branching manifold according to the invention, the entry control device are pivot able disks. Commonly known valves have swiveling handles, or wheels, for manual operation. A pivot able disk can easily by design be added to the axis of such handles, or wheels.

Favorably, in such pipe branching manifold, the test permitting counter element has a radius of the disk. The test permitting counter element being a segment of a circular disk, is particularly easy to manufacture into an entry control device that basically is a circular disk.

Ideally, in a pipe branching manifold according to the invention, the selector device is a pivot able disk. In such pipe branching manifold, selecting any pipe branch for test operation is easily performed by turning the selector device about an axis of the pivot able disk. In another pipe branching manifold according to the invention, the selector device might be a slid able bar, and the entry control device being arranged side by side, along the bar.

In a preferred embodiment of the pipe branching manifold according to the invention, each of the bleed valves has a bleed control device with a second standard blocking counter element positively fitting to a second standard blocking element in the entry control device, and with a second test permitting counter element positively fitting to a second test permitting element in the entry control device, wherein in open state of the entry block valve, mechanical interaction of the second standard blocking element and the second standard blocking counter element prevents the bleed valve from opening, and wherein in closed state of the entry block valve, mechanical interaction of the second test permitting element and the second test permitting counter element allows for opening the bleed valve.

In such pipe branching manifold, each of the entry control device, in addition to interaction with the selector device, has further a double function in interacting with the respective bleed control device: In standard operation this interaction blocks the respective bleed valve, and in test operation releases the same. The further functions of the entry control device keeps this pipe branching manifold even more mechanically simple, and easy to operate.

Preferably, in such pipe branching manifold according to the invention the second standard blocking counter element and the second test permitting element are notches, shaped into the entry control device, and into the bleed control device, respectively. Notches can easily be shaped into the entry control device, and into the bleed control device, e.g. by mold forming, or by milling.

Advantageously, in such pipe branching manifold according to the invention, the bleed control device is a second pivot able disk. Commonly known bleed valves have a swiveling handle, or a wheel, for manual operation. A pivot able disk can easily by design be added to the axis of such handle, or wheel.

Favorably, in such pipe branching manifold, the second standard blocking element has the radius of the disk, and the second test permitting counter element has a radius of the second disk. The second standard blocking element being a segment of a circular disk, is particularly easy to manufacture into a bleed control device that basically is a circular disk.

In a preferred embodiment of the pipe branching manifold according to the invention, each of the exit block valves has an exit control device with a third standard blocking counter element positively fitting to a third standard blocking element in the bleed control device, and with a third test permitting counter element positively fitting to a third test permitting element in the bleed control device, wherein in open state of the entry block valve, mechanical interaction of the third standard blocking element and the third standard blocking counter element prevents the exit block valve from closing, and wherein in open state of the bleed valve, mechanical interaction of the third test permitting element and the third test permitting counter element allows for closing the exit block valve.

In such pipe branching manifold, each of the bleed control device, in addition to interaction with the entry control device, has further a double function in interacting with the respective exit control device: In standard operation this interaction blocks the respective exit block valve, and in test operation releases the same. The further functions of the bleed control device keeps this pipe branching manifold even more mechanically simple, and easy to operate.

Preferably, in such pipe branching manifold according to the invention the third standard blocking counter element and the third test permitting element are notches, shaped into the bleed control device, and into the exit control device, respectively. Notches can easily be shaped into the bleed control device, and into the exit control device, e.g. by mold forming, or by milling.

Advantageously, in such pipe branching manifold according to the invention, the exit control device is a third pivot able disk. Commonly known exit block valves have a swiveling handle, or a wheel, for manual operation. A pivot able disk can easily by design be added to the axis of such handle, or wheel.

Favorably, in such pipe branching manifold, the third standard blocking element has the radius of the second disk, and the third test permitting counter element has a radius of the third disk. The third standard blocking element being a segment of a circular disk, is particularly easy to manufacture into an exit control device that basically is a circular disk.

The invention further suggests a High Integrity Pressure Protecting System (HIPPS) for a fluid line, wherein the HIPPS has an On/Off valve, a logic solver, an initiator for monitoring a downstream pressure of the line, and an actuator, wherein the On/Off valve closes automatically, if the downstream pressure exceeds a critical value, and wherein the initiator has a pipe branching manifold according to the invention, with multiple pipe branches, each of the pipe branches connecting to a respective pressure transmitter. The pipe branching manifold of the HIPPS according to the invention is a "one out of N double block-and-bleed" ("1ooN dbb") manifold as previously characterized in the "background art" section. The HIPPS according to the invention features the advantages previously mentioned for the pipe branching manifold according to the invention. The manifold can be equipped with proximity switches to show the position of the selector, the entry block valve, bleed valve and exit block valve.

The initiator for monitoring downstream pressure of the line can be a pressure transmitter or pressure switch. The On/Off valve can be automatically closed by the initiator (pressure switch), or by the logic solver. The HIPPS can have a test connection downstream of the exit valve, between the exit block valve and the initiator (pressure transmitter, sensor). Alternatively, testing can be done via bleed valve. Position switch on selector device and/or any of the control device can enable remote detection.

The invention even further suggests a method of operating a pipe branching manifold according to the invention, comprising the step of selecting any of the pipe branches for switching from the standard operation to a test operation. The method according to the invention also features the advantages previously mentioned for the pipe branching manifold according to the invention.

BRIEF DESCRIPTION OF THE DRAWINGS

The apparatus according to the invention and the associated method are subsequently described in more detail with reference to preferred embodiments illustrated in the following schematic figures.

DETAILED DESCRIPTION OF THE INVENTION

Figure 1:
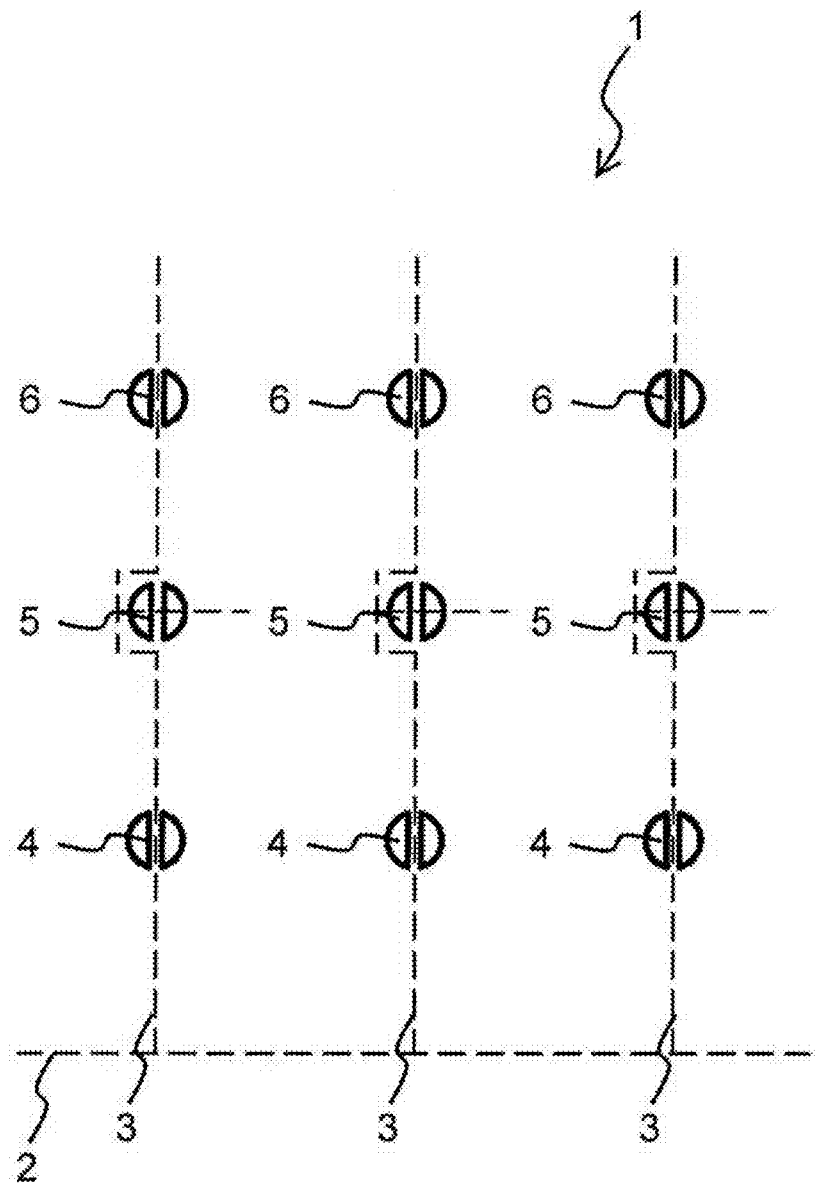
FIG. 1 shows the valves in a state of the art 1003 dbb manifold, in standard operation.

FIG. 1 schematically shows a state-of-the-art "one out of three double block-and-bleed" ("1oo3 dbb") manifold 1 for use in a High Integrity Pressure Protecting System (HIPPS), and connecting three separate pressure transmitters to a gas or oil fluid line 2. The known manifold 1 has one process connection splitting into three separate pipe branches 3, each connected to the fluid line 2, having an entry block valve 4, a bleed valve 5 and an exit block valve 6, and connecting to one of the pressure transmitters. The entry block valves 4, the bleed valves 5, and the exit block valve 6 are ball valves, and are opened or closed by rotating each about an axis at right angle to the figured plane, a quarter-turn clockwise, or counter-clockwise. The pressure transmitters, as well as further parts of the HIPPS are not shown in FIG. 1.

In each branch 3, in standard operation of the manifold 1, the fluid first passes through the entry block valve 4, then through the bleed valve 5, then through the exit block valve 6, and finally into the pressure transmitters.

Figure 2A:
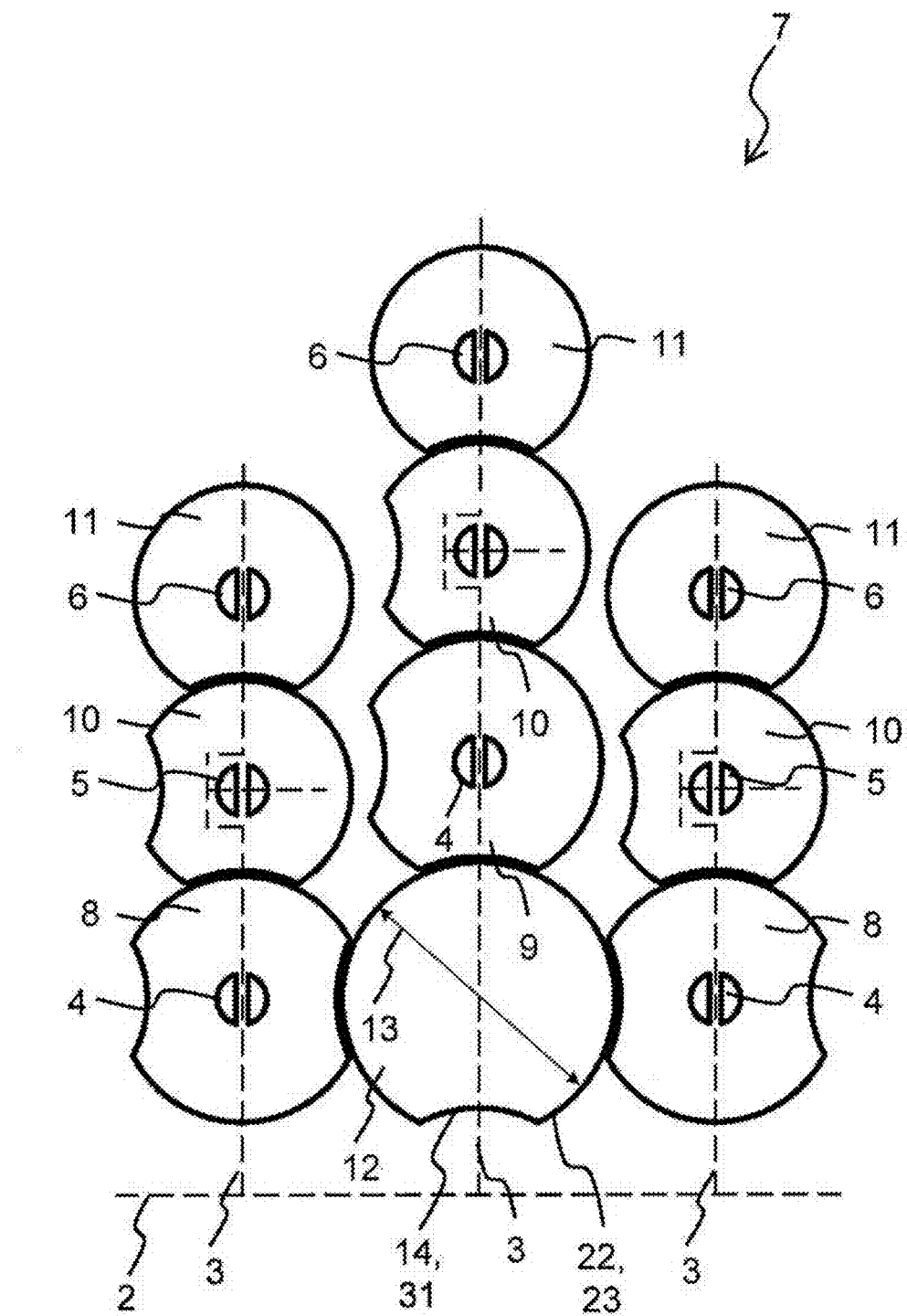
FIG. 2A shows a 1003 dbb manifold according to the invention, in standard operation.

FIG. 2A shows a first manifold 7 according to the invention, based on the above mentioned, known manifold 1. In the manifold 7, each entry block valve 4 has an entry control device 8, 9, each bleed valve 5 has a bleed control device 10 and each exit block valve 6 has an exit control device 11. The manifold 7 further has a selector device 12 for selecting any of the branches 3, for test operation. In the manifold 7, the selector device 12, the entry control device 8, 9, the bleed control device 10, and the exit control device 11 are all basically circular, pivot able disks that are (apart from the selector device 12) mounted to the operating axes of the entry block valves 4, bleed valves 5 and exit block valve 6. The operating axes are not shown. The selector device 12 has a diameter 13 of 100 mm and has one single notch 14 fitting the diameter 15 of the entry control device 8, 9. In other preferred embodiments the diameter 13 changes based upon the valve dimensions.

Figure 2B:
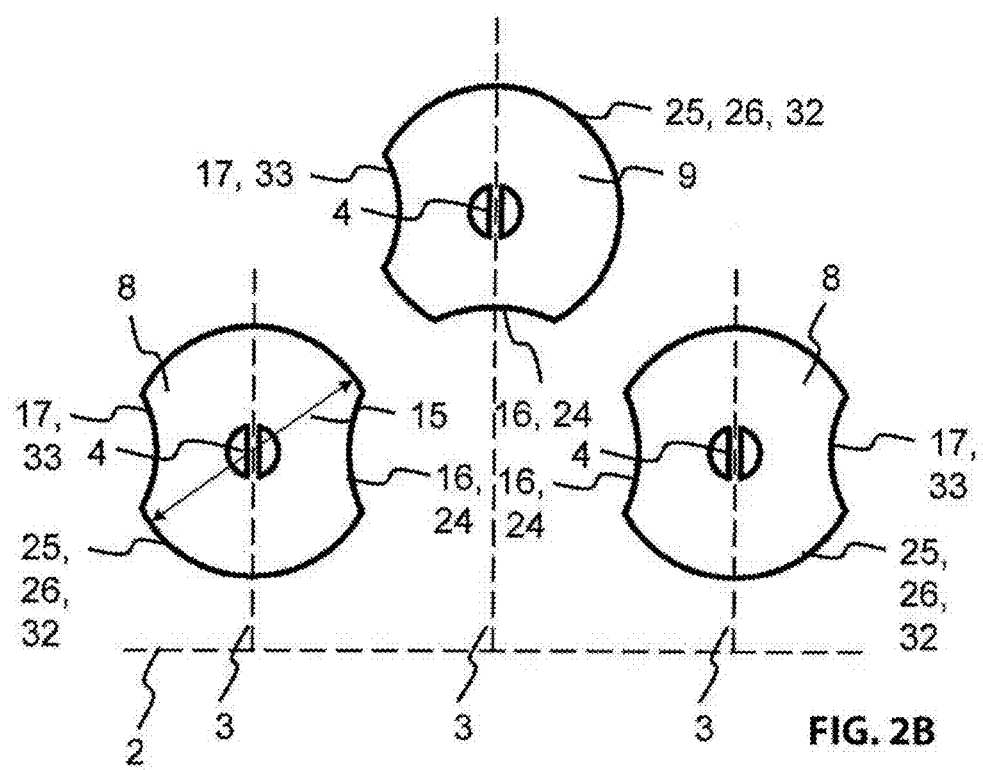
FIG. 2B shows the entry control device of the manifold.
Figure 2C:
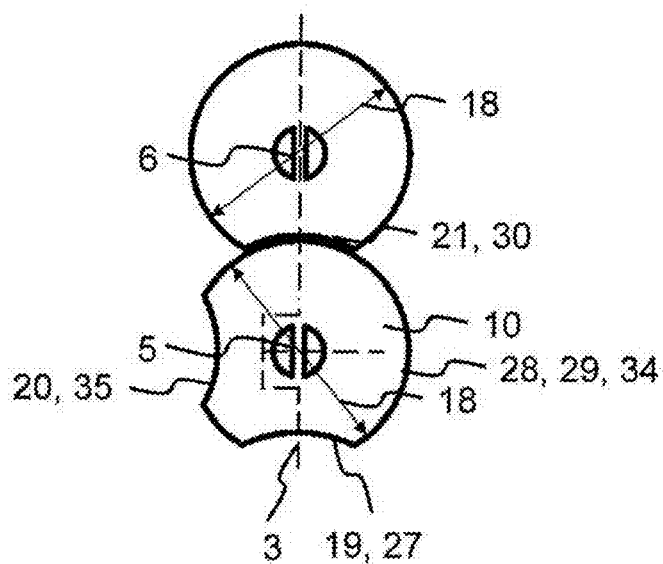
FIG. 2C shows an bleed control device and an exit control device of the manifold.

The entry control device 8, 9 shown in FIG. 2B have a diameter 15 of 90 mm, and one notch 16 fitting the diameter 13 of the selector device 12, and another notch 17 fitting the diameter 18 of the bleed control device 10. In other preferred embodiments the diameter 15 changes based upon the valve dimensions. The manifold 7 has two different types of entry control device 8, 9: The entry control device 8 of the first type are mounted to the entry block valves 4 of the left and right branches 3. The first notch 16 and the second notch 17 are on opposite sides of the entry control device 8.

A second type entry control device 9 is mounted to the entry block valve 4 of the middle branch 3, and has the first notch 16 and the second notch 17 at right angle.

The bleed control device 10 and the exit control device 11 of the manifold 7 are identical for all three branches. Both have a diameter 18 of 80 mm. In other preferred embodiments the diameter 18 changes based upon the valve dimensions. The bleed control device 10 has a first notch 19 fitting the diameter 15 of the entry control device 8, 9, and at right angle, a second notch 20 fitting the diameter 18 of the exit control device 11. The exit control device 11 has one single notch 21 fitting the diameter 18 of the bleed control device 10. In the first manifold 7, the entry control device 8, 9, the bleed control device 10, the exit control device 11, and the selector device 12 are coplanar, the notches 14, 16, 17, 19, 20, 21 of the first manifold 7 are lens-shaped.

In standard operation mode of the manifold 7, the circular edge 22 as standard blocking element 23 of the selector device 12 fits the first notches 16 as standard blocking counter elements 24 of the entry control device 8, 9, preventing rotation of the same, and closing the entry block valves 4. The circular edges 25 as second standard blocking elements 26 of the entry control device 8, 9 fit the first notches 19 as second standard blocking counter elements 27 of the bleed control device 10, preventing rotation of the same, and opening the bleed valves 5 to the ambience. The circular edges 28 as third standard blocking elements 29 of the bleed control device 10 fit the notches 21 as third standard blocking counter elements 30 of the exit control device 11, preventing rotation of the same, and closing the exit block valve 6.

Figure 3A:
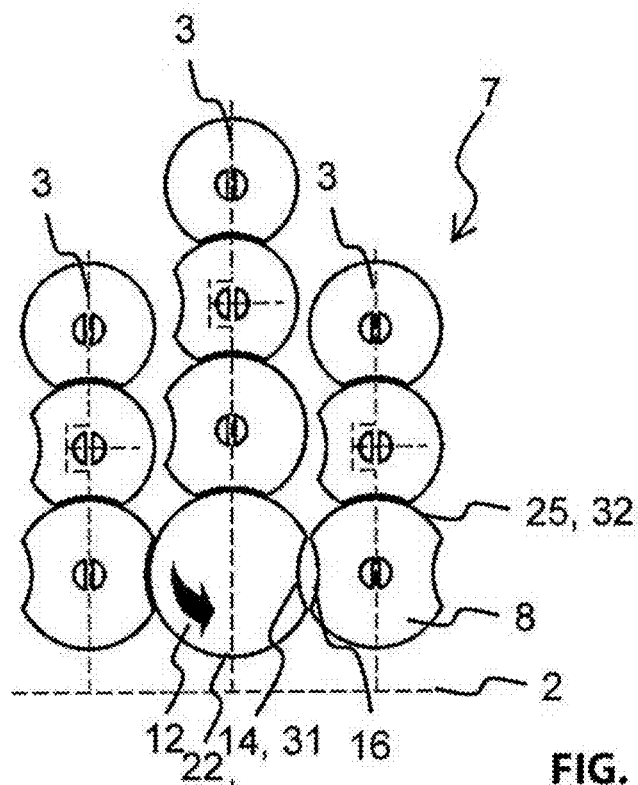
FIG. 3A shows the manifold, with one branch selected for test operation.

FIGS. 3A to 3D show the sequence of action for setting the manifold 7 to test operation for the right branch 3:

First, according to FIG. 3A, the selector device 12 is rotated a quarter-turn counter-clockwise. The notch 14 as test permitting element 31 of the selector device 12 now fits the circular edge 25 as test permitting counter element 32 of the right entry control device 8, allowing rotation of the same.

Figure 3B:
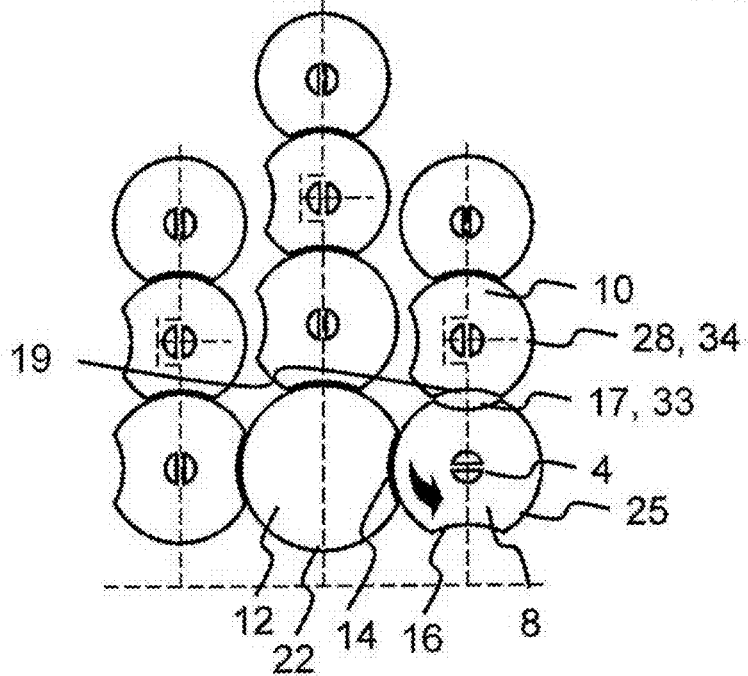
FIG. 3B shows the manifold, with the entry block valve of the selected branch closed.

Second, according to FIG. 3B, the right entry control device 8 is rotated a quarter-turn counter-clockwise, and the right entry block valve 4 closed. The second notch 17 as second test permitting element 33 of the right entry control device 8 now fits the circular edge 28 as second test permitting counter element 34 of the right bleed control device 10, allowing rotation of the same. The circular edge 25 of the right entry control device 8 now fits the notch 14 of the selector device 12, preventing rotation of the same.

Figure 3C:
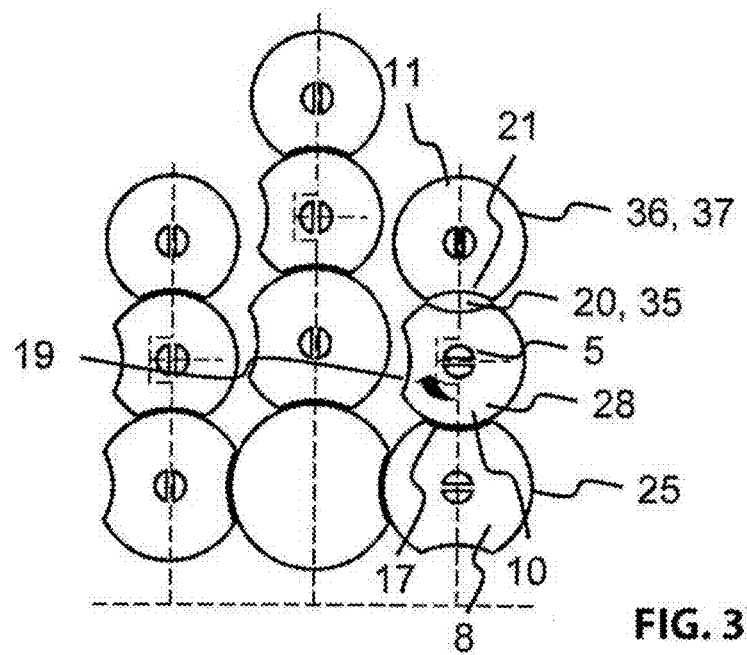
FIG. 3C shows the manifold, with the bleed valve of the selected branch open.

Third, according to FIG. 3C, the right bleed control device 10 is rotated a quarter-turn clockwise, and the right bleed valve 5, and thus the pressure transmitter opened to the ambience. The second notch 20 as third test permitting element 35 of the right bleed control device 10 now fits the circular edge 36 as third test permitting counter element 37 of the right exit control device 11, allowing rotation of the same. The circular edge 28 of the right bleed control device 10 now fits the second notch 17 of the right entry control device 8, preventing rotation of the same.

Figure 3D:
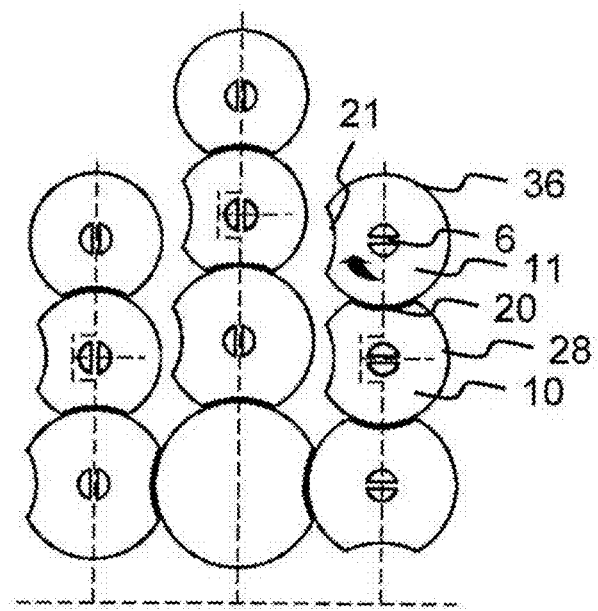
FIG. 3D shows the manifold, with the exit block valve of the selected branch closed.

Fourth, according to FIG. 3D, the right exit control device 11 is rotated a quarter-turn clockwise, and the right exit block valve 6 closed. The circular edge 36 of the right exit control device 11 now fits the second notch 20 of the right bleed control device 10, preventing rotation of the same.

After setting to the test operation mode shown in FIG. 3D, a pressure transmitter at the right branch 3 is both relieved from the pressure of the fluid line 2, and separated from the right branch 3. The pressure transmitter can now be tested, or replaced, without affecting the function of the HIPPS.

Deviating from the above, for setting the manifold 7 to test operation for the left branch 3, the selector device 12 would have been rotated a quarter-turn clockwise. For setting to test operation for the middle branch 3, the selector device 12 would have been rotated a half-turn, and the middle entry control device 9 a quarter-turn clockwise, instead. For each of the branches 3, operation of the bleed control device 10 and the exit control device 11 are as above.

After successful testing, or replacing the pressure transmitter at the right branch 3, the sequence of action shown in FIG. 3A to 3D must be reversed, back to standard operation mode:

First, reversing FIG. 3D, the right exit control device 11 is rotated a quarter-turn counter-clockwise, and the right exit block valve 6 opened, and thus the pressure transmitter opened to the ambience. The notch 21 of the right exit control device 11 now fits the circular edge 28 of the right bleed control device 10, allowing rotation of the same.

Second, reversing FIG. 3C, the right bleed control device 10 is rotated a quarter-turn counter-clockwise, and the right bleed valve 5, and thus the pressure transmitter closed from the ambience. The first notch 19 of the right bleed control device 10 now fits the circular edge 25 of the right entry control device 8, allowing rotation of the same. The circular edge 28 of the right bleed control device 10 now fits the notch 21 of the right exit control device 11, preventing rotation of the same.

Third, reversing FIG. 3B, the right entry control device 8 is rotated a quarter-turn clockwise, and the right entry block valve 4, and thus the pressure transmitter opened to the fluid line 2. The first notch 16 of the right entry control device 8 now fits the circular edge 22 of the selector device 12, allowing rotation of the same. The circular edge 25 of the right entry control device 8 now fits the first notch 19 of the right bleed control device 10, preventing rotation of the same.

Fourth, reversing FIG. 3A, the selector device 12 is rotated a quarter-turn clockwise. The circular edge 22 of the selector device 12 now fits the first notch 16 of the right entry control device 8, preventing rotation of the same. Alternatively, the selector device 12 may be turned a half-turn, for setting the manifold 7 to test operation for the left branch 3, or a quarter-turn counter-clockwise, for setting the manifold 7 to test operation for the middle branch 3.

Figure 4:
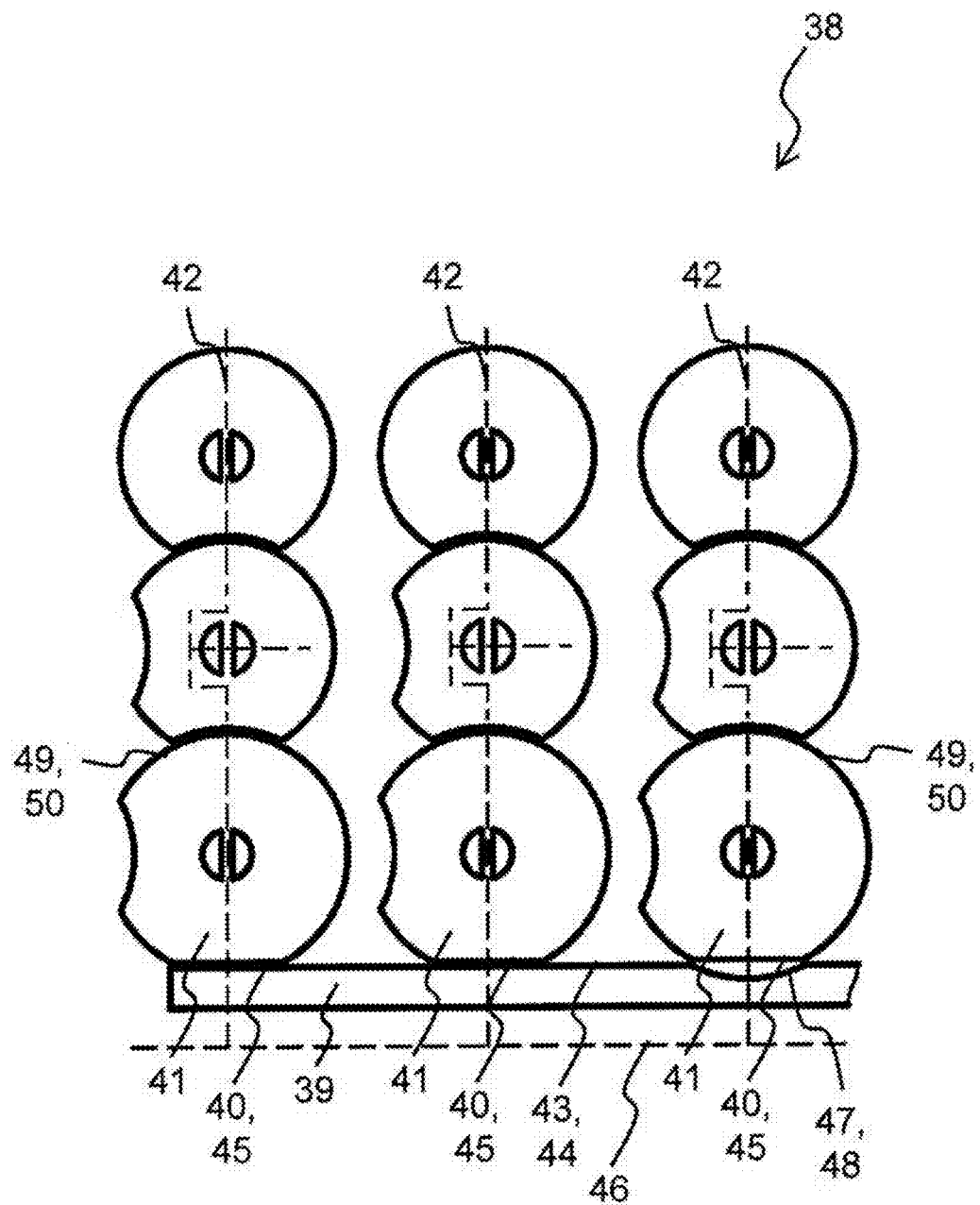
FIG. 4 shows a second manifold, according to the invention.

FIG. 4 shows a second manifold 38 according to the invention that differs from the first manifold 7 presented above, in that the selector device 39 is a bar and the first notches 40 of the entry control device 41 are straightly cut segments.

The second manifold 38 is shown in standard operation mode, but prepared for test operation of the right pipe branch 42: The upper straight edge 43 as standard blocking element 44 of the selector device 39 fits the first notches 40 as standard blocking counter elements 45 of the left and middle entry control device 41, preventing rotation of the same, and closing the left and middle entry block valves, and the respective pressure transmitters, from the fluid line 46. A notch 47 as test permitting element 48 of the selector device 39 fits the circular edge 49 as test permitting counter element 50 of the right entry control device 41, allowing rotation of the same, and closing the right entry block valve, and the respective pressure transmitter, from the fluid line 46. The pressure transmitters are not shown.

Figure 5A:
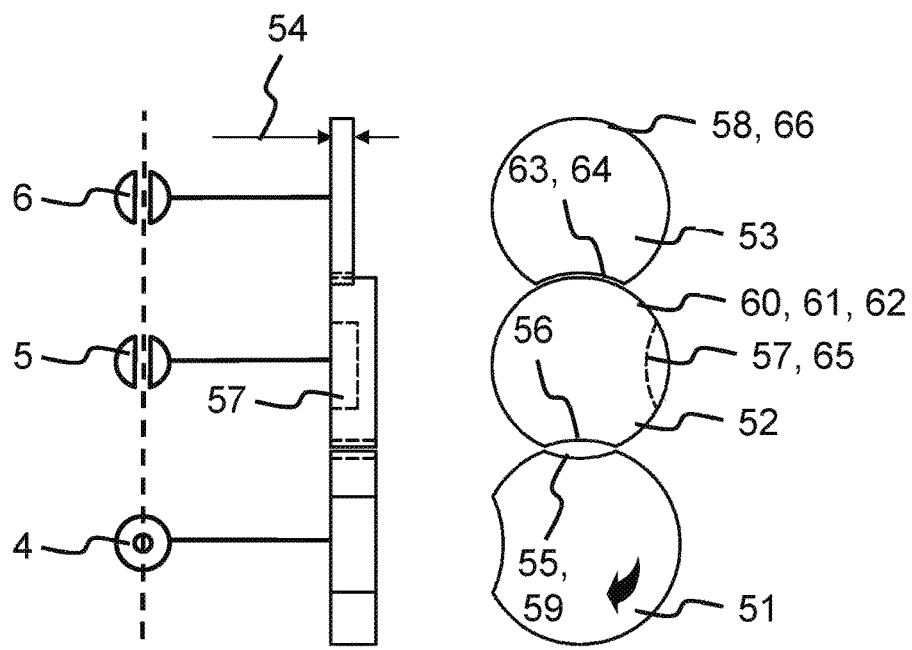
FIG. 5A shows a branch detail of a third manifold, according to the invention, with the entry block valve closed.

FIG. 5A shows a side view and a top view of an entry control device 51, a bleed control device 52, and an exit control device 53 in a branch of a third (further not shown) manifold according to the invention. The third manifold differs from the first manifold 7 in that the bleed valves are needle valves, that require three quarter-turns (instead of one) clockwise, for fully opening to the ambience.

In the third manifold, the entry control device 51 and the exit control device 53 are basically identical in shape to those of the first manifold 7. Only has the entry control device 51 double the thickness 54 of the exit control device 53, and is the second notch 55 (and accordingly the first notch 56 of the bleed control device 52) smaller than in the first manifold 7.

The bleed control device 52 also has double the thickness 54 of the exit control device 53. And further deviating from the first manifold 7, the second notch 57 of the bleed control device 52, that fits to the circular edge 58 of the exit control device 53, has only (slightly more than) the thickness 54 of the exit control device 53.

According to FIG. 5A, the related branch is selected for test operation, the entry control device 51 rotated a quarter-turn clockwise, and the entry block valve closed. The second notch 55 as second test permitting element 59 of the entry control device 51 fits the circular edge 60 as second test permitting counter element 61 of the bleed control device 52, allowing rotation of the same. The circular edge 60 as third standard blocking element 62 of the bleed control device 52 fits the notch 63 as third standard blocking counter element 64 of the exit control device 53, preventing rotation of the same.

Figure 5B:
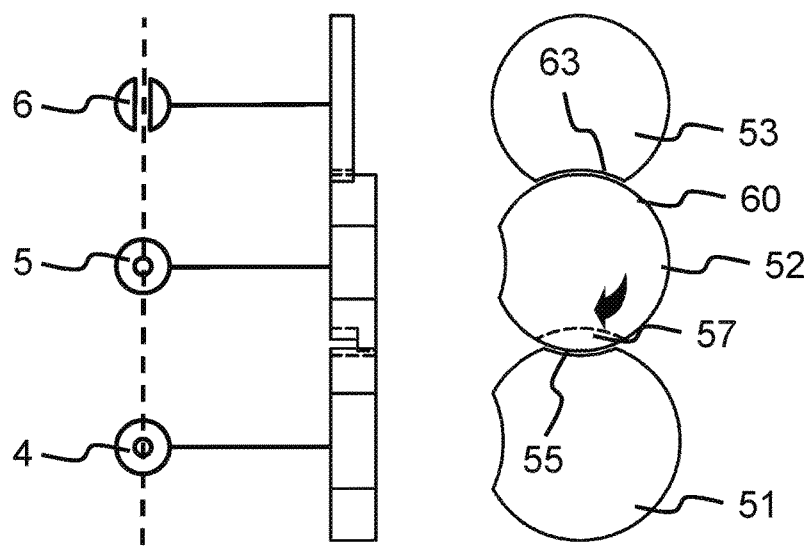
FIGS. 5B-5D show the detail, with the bleed valve one third, two thirds and fully open.

After turning the bleed control device 52 one quarter-turn clockwise, according to FIG. 5B, the bleed valve is one third open. The second notch 55 of the entry control device 51 still fits the circular edge 60 of the bleed control device 52, that the second notch having slightly more thickness than 54. Fill the notch of 55 of entry control device 51 the second notch 57 of the bleed control device 52. The circular edge 60 of the bleed control device 52 still fits the notch 63 of the exit control device 53.

Figure 5C:
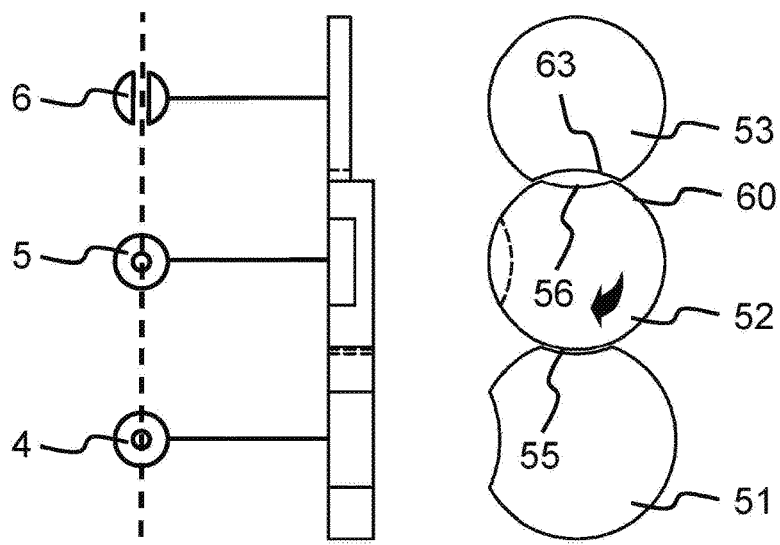

After turning the bleed control device 52 another quarter-turn clockwise, according to FIG. 5C, the bleed valve is two thirds open. The second notch 55 of the entry control device 51 still fits the circular edge 60 of the bleed control device 52. The circular edge 60 of the bleed control device 52 still fits the notch 63 of the exit control device 53, because the first notch 56 of the bleed control device 52 is smaller than the notch 63 of the exit control device 53.

Figure 5D:
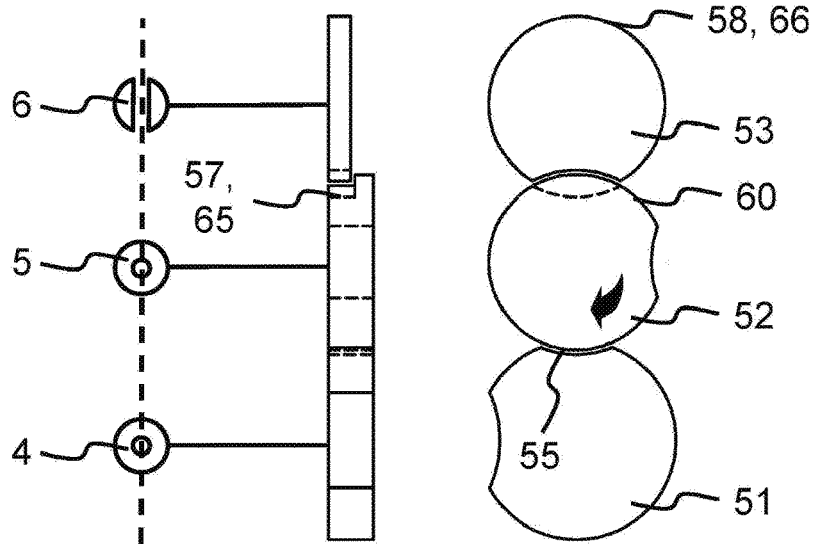

After turning the bleed control device 52 a last quarter-turn clockwise, according to FIG. 5D, the bleed valve is fully open. The second notch 55 of the entry control device 51 still fits the circular edge 60 of the bleed control device 52. The second notch 57 as third test permitting element 65 of the bleed control device 52 fits the circular edge 58 as third test permitting counter element 66 of the exit control device 53, allowing rotation of the same, and closing the exit block valve.

Figure 6A:
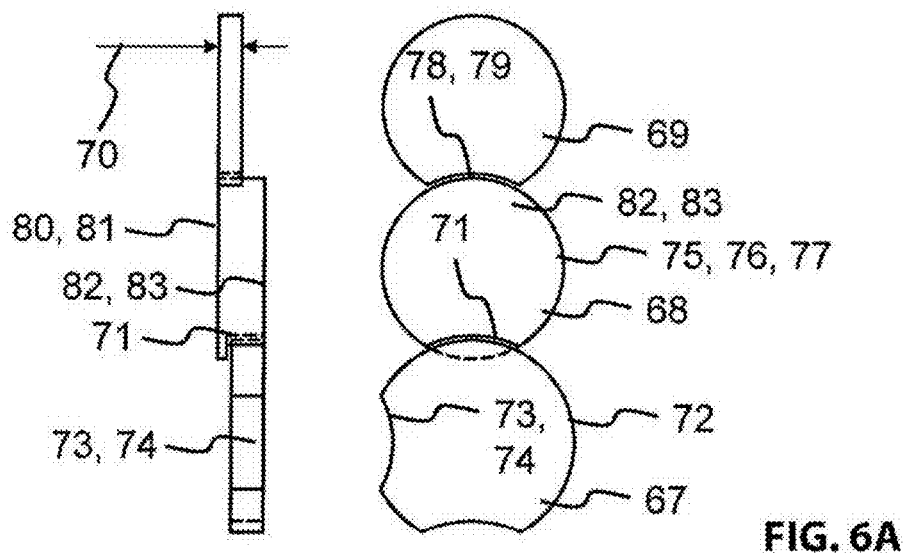
FIG. 6A shows a branch detail of a fourth manifold, according to the invention, in standard operation.

FIG. 6A shows a side view and a top view of an entry control device 67, a bleed control device 68, and an exit control device 69 in a branch of a fourth (further not shown) manifold according to the invention. The fourth manifold differs from the first manifold 7 in that the bleed valves are needle valves that require multiple (instead of one quarter) turns counter-clockwise, for fully opening to the ambience.

In the fourth manifold, the entry control device 67 and the exit control device 69 are basically identical in shape to the entry control device 67 and the exit control device 69 of the first manifold 7. Only has the entry control device 67 one and a half times the thickness 70 of the exit control device 69.

The bleed control device 68 has double the thickness 70 of the exit control device 69. Further deviating from the first manifold 7, the first notch 71 of the bleed control device 68, that fits to the circular edge 72 of the entry control device 67, has only (slightly more than) the thickness 70 of the same. And the bleed control device 68 has no second control device that fits to the exit control device 69. Instead, the bleed control device 68, in rotating lifts over the exit control device 69, for allowing rotation of the same.

Figure 6B:
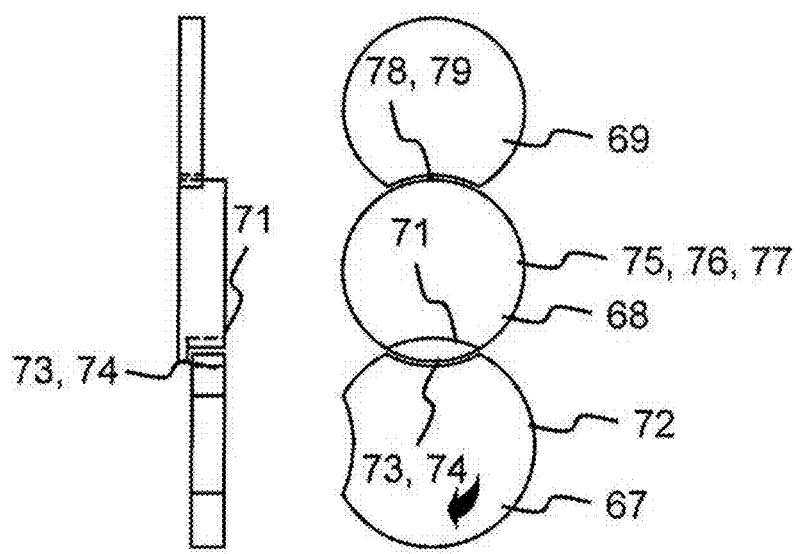
FIG. 6B shows the detail, with the entry block valve closed.

Starting from standard operation mode, shown in FIG. 6A, after the related branch is selected for test operation, according to FIG. 6B, the entry control device 67 is rotated a quarter-turn clockwise, and the entry block valve closed. The second notch 73 as second test permitting element 74 of the entry control device 67 fits the circular edge 75 as second test permitting counter element 76 of the bleed control device 68, allowing rotation of the same. The circular edge 75 as third standard blocking element 77 of the bleed control device 68 fits the notch 78 as third standard blocking counter element 79 of the exit control device 69, preventing rotation of the same.

Figure 6C:
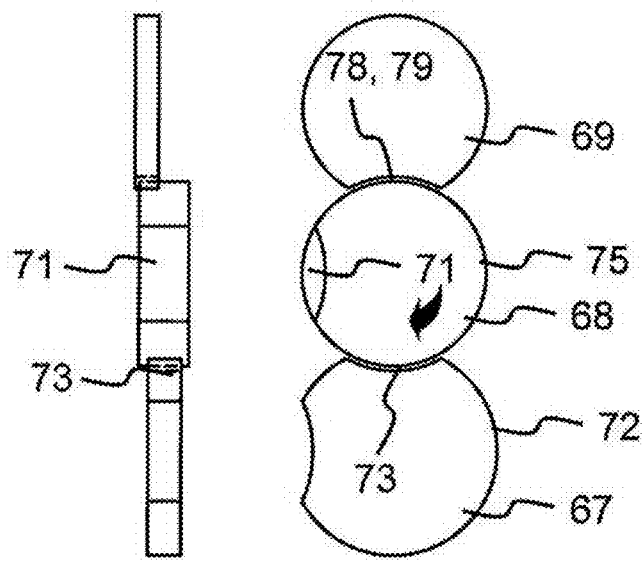
FIG. 6C-6G show the detail, with the bleed valve in four steps partly open, and fully open.

After turning the bleed control device 68 one quarter-turn clockwise, according to FIG. 6C, the bleed valve is one sixth open. The second notch 73 of the entry control device 67 still fits the circular edge 75 of the bleed control device 68. The circular edge 75 of the bleed control device 68 still fits the notch 78 of the exit control device 69.

Figure 6D:
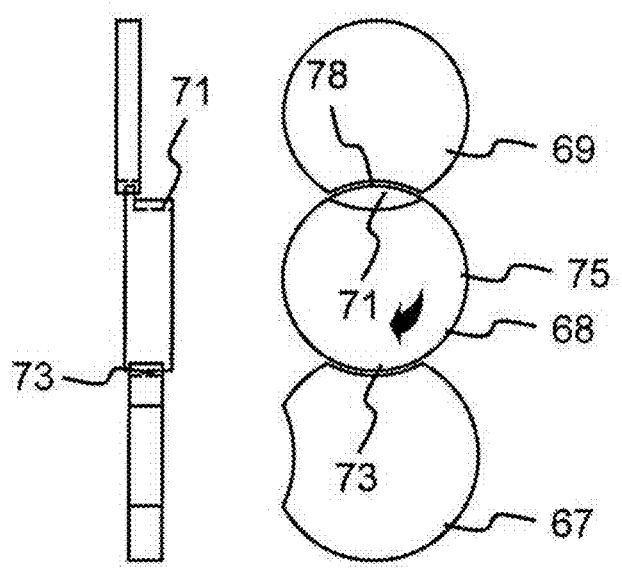

After turning the bleed control device 68 another quarter-turn clockwise, according to FIG. 6D, the bleed valve is two sixth open. The second notch 73 of the entry control device 67 still fits the circular edge 75 of the bleed control device 68. The circular edge 75 of the bleed control device 68 that overlaps the first notch 71 of the bleed control device 68 still fits the notch 78 of the exit control device 69.

Figure 6E:
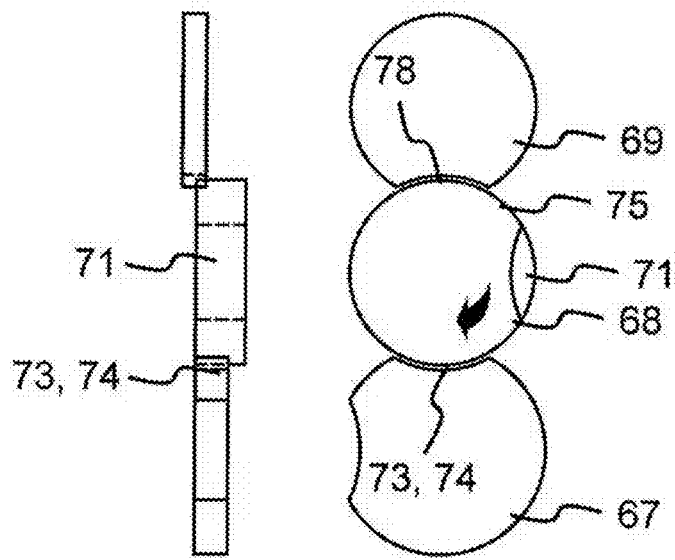

After turning the bleed control device 68 another quarter-turn clockwise, according to FIG. 6E, the bleed valve is half open. The second notch 73 of the entry control device 67 still fits the circular edge 75 of the bleed control device 68. The circular edge 75 of the bleed control device 68 still fits the notch 78 of the exit control device 69.

Figure 6F:
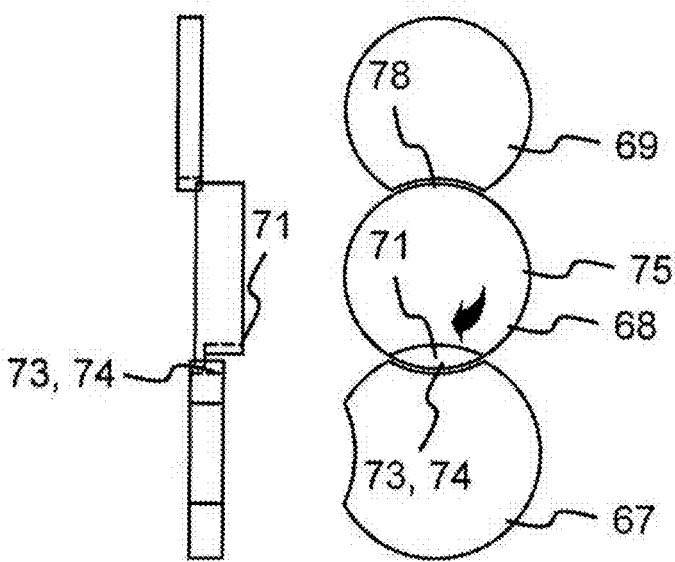

After turning the bleed control device 68 another quarter-turn clockwise, according to FIG. 6F, the bleed valve is two thirds open. The second notch 73 of the entry control device 67 still fits the circular edge 75 of the bleed control device 68 that overlaps the first notch 71 of the bleed control device 68. The circular edge 75 of the bleed control device 68 still fits the notch 78 of the exit control device 69.

Figure 6G:
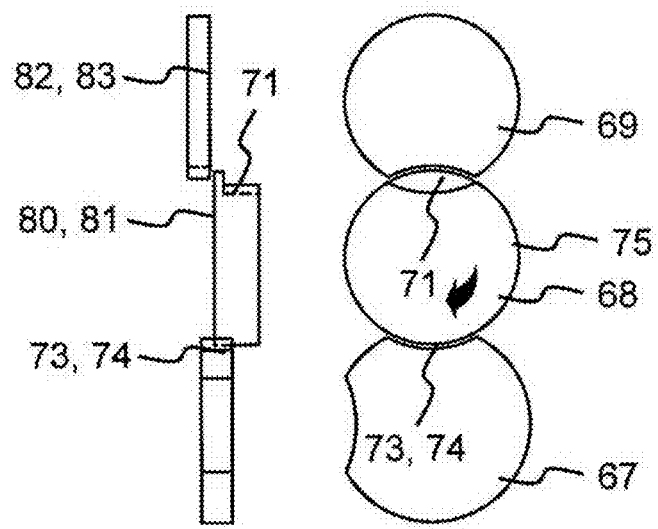

After turning the bleed control device 68 a last half-turn clockwise, according to FIG. 6G, the bleed valve is fully open. The second notch 73 of the entry control device 67 still fits the circular edge 75 of the bleed control device 68. Meanwhile, the bleed control device 68 has lifted over the exit control device 69. The lower surface 80 as third test permitting element 81 of the bleed control device 68 thus fits the upper surface 82 as third test permitting counter element 83 of the exit control device 69, allowing rotation of the same, and closing the exit block valve.

Figure 7A:
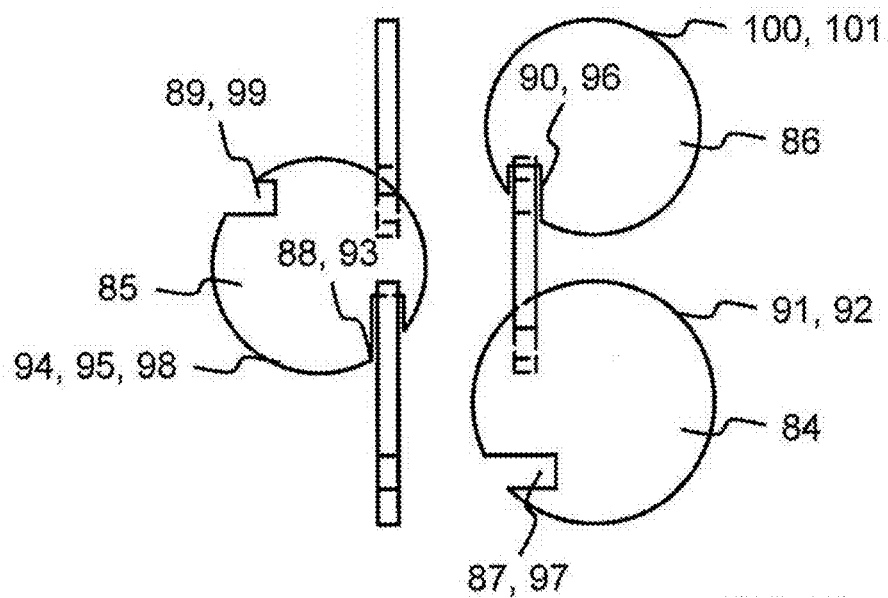
FIG. 7A shows a branch detail of a fifth manifold, according to the invention, in standard operation.

FIG. 7A shows a side view and a top view of an entry control device 84, a bleed control device 85, and an exit control device 86 in a branch of a fifth (further not shown) manifold according to the invention. The fifth manifold differs from the first manifold 7 in that it has the bleed valves on the side of the branch.

As in the first manifold 7, the entry control device 84 has one notch fitting the selector device (neither notch nor selector device are shown, here), and another notch 87 fitting the bleed control device 85. The bleed control device 85 has a first notch 88 fitting the entry control device 84, and at right angle, a second notch 89 fitting the exit control device 86. The exit control device 86 has one single notch 90 fitting the bleed control device 85. In the branch, the entry control device 84 and the exit control device 86 are coplanar, and perpendicular to the bleed control device 85. The notches 87, 88, 89, 90 of the fifth manifold are slots.

In standard operation mode, shown in FIG. 7A, the circular edge 91 as second standard blocking element 92 of the entry control device 84 fits the first notch 88 as second standard blocking counter element 93 of the bleed control device 85, preventing rotation of the same. The circular edge 94 as third standard blocking element 95 of the bleed control device 85 fits the notch 90 as third standard blocking counter element 96 of the exit control device 86, preventing rotation of the same.

Figure 7B:
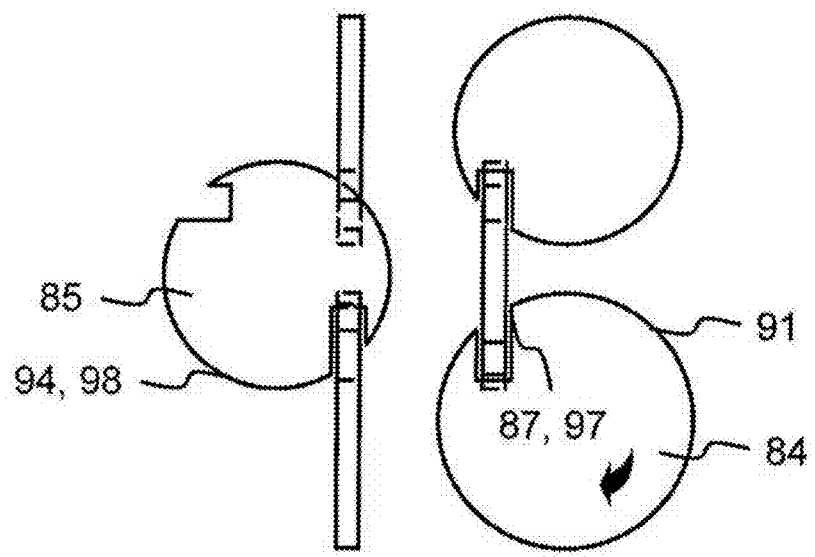
FIG. 7B shows the detail, with the entry block valve closed.
Figure 7C:
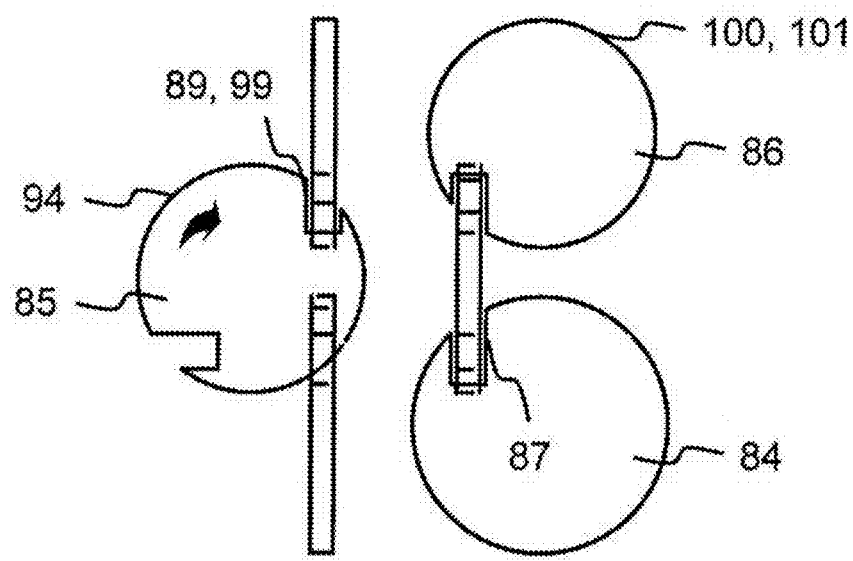
FIG. 7C shows the detail, with the bleed valve open.

FIGS. 7B and 7C show the sequence of action for setting the branch to test operation:

After selecting the branch for test operation, according to FIG. 7B, the entry control device 84 is rotated a quarter-turn counter-clockwise, and the right entry block valve closed. The second notch 87 as second test permitting element 97 of the entry control device 84 now fits the circular edge 94 as second test permitting counter element 98 of the bleed control device 85, allowing rotation of the same. The circular edge 91 of the entry control device 84 now prevents rotation of the selector device.

Then, according to FIG. 7C, the bleed control device 85 is rotated a quarter-turn clockwise, and the bleed valve, and thus the pressure transmitter opened to the ambience. The second notch 89 as third test permitting element 99 of the bleed control device 85 now fits the circular edge 100 as third test permitting counter element 101 of the exit control device 86, allowing rotation of the same. The circular edge 94 of the bleed control device 85 now fits the second notch 87 of the entry control device 84, preventing rotation of the same.

In yet another HIPPS according to the invention, a test connection may be between exit block valve and pressure transmitter (sensor). Further alternatively, testing may be done via the bleed valve. A position switch on the selector device and/or any of the control device may enable remote detection.

REFERENCE NUMERALS AND DESIGNATIONS 1 manifold
2 fluid line
3 branch
4 entry block valve
5 bleed valve
6 exit block valve
7 manifold
8 entry control device
9 entry control device
10 bleed control device
11 exit control device
12 selector device
13 diameter
14 notch
15 diameter
16 notch
17 notch
18 diameter
19 notch
20 notch
21 notch
22 edge
23 standard blocking element
24 standard blocking counter element
25 edge
26 standard blocking element
27 standard blocking counter element
28 edge
29 standard blocking element
30 standard blocking counter element
31 test permitting element
32 test permitting counter element
33 test permitting element
34 test permitting counter element
35 test permitting element
36 edge
37 test permitting counter element
38 manifold
39 selector device
40 notch
41 entry control device
42 branch
43 edge
44 standard blocking element
45 standard blocking counter element
46 fluid line
47 notch
48 test permitting element
49 edge
50 test permitting counter element
51 entry control device
52 bleed control device
53 exit control device
54 thickness
55 notch
56 notch
57 notch
58 edge
59 test permitting element
60 edge
61 test permitting counter element
62 standard blocking element
63 notch
64 standard blocking counter element
65 test permitting element
66 test permitting counter element
67 entry control device
68 bleed control device
69 exit control device
70 thickness
71 notch
72 edge
73 notch
74 test permitting element
75 edge 76 test permitting counter element
77 standard blocking element
78 notch
79 standard blocking counter element
80 surface
81 test permitting element
82 surface
83 test permitting counter element
84 entry control device
85 bleed control device
86 exit control device
87 notch
88 notch
89 notch
90 notch
81 edge
92 standard blocking element
93 standard blocking counter element
94 edge
95 standard blocking element
96 standard blocking counter element
97 test permitting element
98 test permitting counterelement
99 test permitting element
100 edge
101 test permitting counterelement

What is claimed is:

1. A pipe branching manifold, comprising:
a multitude of pipe branches,
wherein each pipe branch of the multitude of pipe branches includes
an entry block valve,
an exit block valve, and
a bleed outlet including a bleed valve arranged between the entry block valve and the exit block valve,
wherein in a standard operation of each pipe branch a respective entry block valve and a respective exit block valve is open and a respective bleed valve is closed,
wherein in a test operation or maintenance operation of each pipe branch the respective entry block valve and the respective exit block valve is closed, and the respective bleed valve is open,
wherein the pipe branching manifold includes a selector device for selecting either none or one out of the multitude of pipe branches for switching from the standard operation to the test operation or the maintenance operation,
wherein the selector device allows only an entry block valve of a selected pipe branch of the multitude of pipe branches to be closed, which subsequently allows a respective bleed valve and a respective exit block valve of the selected pipe branch to be opened and closed to switch to the test operation or to the maintenance operation respectively,
wherein the selector device includes a standard blocking element and a test permitting element,
wherein the entry block valve includes an entry control device which includes a standard blocking counter element positively fitting to the standard blocking element, and a test permitting counter element positively fitting to the test permitting element,
wherein in the standard operation of the respective pipe branch, mechanical interaction of the standard blocking element and the standard blocking counter element prevents the entry block valve from closing, and
wherein after selecting the respective pipe branch for test operation mechanical interaction of the test permitting element and the test permitting counter element allows for closing the entry block valve and subsequent opening and closing of the respective bleed valve and the respective exit valve to enable either the test operation or the maintenance operation.

2. The pipe branching manifold according to claim 1, wherein the standard blocking counter element and the test permitting element are notches.

3. The pipe branching manifold according to claim 1, wherein the entry control device is a pivotable disk.

4. The pipe branching manifold according to claim 3, wherein the test permitting counter element has a radius of the pivotable disk.

5. The pipe branching manifold according to claim 1, wherein the selector device is a pivotable disk.

6. The pipe branching manifold according to claim 1,
wherein the bleed valve includes
a bleed control device that includes a second standard blocking counter element positively fitting to a second standard blocking element in the entry control device, and
a second test permitting counter element positively fitting to a second test permitting element in the entry control device,
wherein in open state of the entry block valve, mechanical interaction of the second standard blocking element and the second standard blocking counter element prevents the bleed valve from opening, and
wherein in closed state of the entry block valve mechanical interaction of the second test permitting element and the second test permitting counter element allows for opening the bleed valve.

7. The pipe branching manifold according to claim 6, wherein the second standard blocking counter element and the second test permitting element are notches.

8. The pipe branching manifold according to claim 6, wherein the bleed control device is a second pivotable disk.

9. The pipe branching manifold according to the claim 8,
wherein the second standard blocking element has a radius of the pivotable disk, and
wherein a second test permitting counter element has a radius of the second pivotable disk.

10. The pipe branching manifold according to any of claim 6,
wherein the exit block valve includes an exit control device which includes a third standard blocking counter element positively fitting to a third standard blocking element in the bleed control device, and
a third test permitting counter element positively fitting to a third test permitting element in the bleed control device,
wherein in open state of the entry block valve mechanical interaction of the third standard blocking element and the third standard blocking counter element prevents the exit block valve from closing, and
wherein in open state of the bleed valve, mechanical interaction of the third test permitting element and the third test permitting counter element allows for closing the exit block valve.

11. The pipe branching manifold according to claim 10, wherein the third standard blocking counter element and the third test permitting element are notches.

12. The pipe branching manifold according to claim 10, wherein the exit control device is a third pivotable disk.

13. The pipe branching manifold according to claim 12, wherein the third standard blocking element has the radius of the second pivotable disk, and that the third test permitting counter element has a radius of the third pivotable disk.

14. A High Integrity Pressure Protecting System for a fluid line, the High Integrity Pressure Protecting System comprising:
an On/Off valve;
a logic solver, an initiator for monitoring a downstream pressure of the line, and
an actuator;
the pipe branching manifold according to claim 1;
wherein the On/Off valve closes automatically if the downstream pressure exceeds a critical value, and
wherein the initiator includes a pipe branching manifold with multiple pipe branches,
wherein each of the multiple pipe branches connects to a respective pressure transmitter.

15. A method of operating a pipe branching manifold including a multitude of pipe branches, each of the pipe branches including an entry block valve, an exit block valve, and a bleed outlet with a bleed valve between the entry block valve and the exit block valve, wherein in a standard operation of each pipe branch, the respective entry block valve and exit block valve are open, and the respective bleed valve is closed, the method comprising the steps:
selecting any of the pipe branches for switching from the standard operation to a test operation,
wherein in the test operation the respective entry block valve and exit block valve are closed, and the respective bleed valve is open, and
wherein for selecting the pipe branch a selector device of the manifold allows only the entry block valve of the selected pipe branch to be closed,
wherein the selector device includes a standard blocking element and a test permitting element,
wherein each of the entry block valves includes an entry control device with a standard blocking counter element positively fitting to the standard blocking element and a test permitting counter element positively fitting to the test permitting element,
wherein in standard operation of the respective pipe branch, mechanical interaction of the standard blocking element and the standard blocking counter element prevents the entry block valve from closing, and
wherein after selecting the respective pipe branch for test operation, mechanical interaction of the test permitting element and the test permitting counter element allows for closing the entry block valve.

* * * * *